US009661835B1

(12) United States Patent
Sandstrom

(10) Patent No.: US 9,661,835 B1
(45) Date of Patent: May 30, 2017

(54) MOTOR DRIVEN FISHING REEL

(71) Applicant: Thomas Sandstrom, Fort Lauderdale, FL (US)

(72) Inventor: Thomas Sandstrom, Fort Lauderdale, FL (US)

(73) Assignee: HOOKER TRUST LLC, Fort Lauderdale, FL (US)

( * ) Notice: Subject to any disclaimer, the term of this patent is extended or adjusted under 35 U.S.C. 154(b) by 314 days.

(21) Appl. No.: 14/325,448

(22) Filed: Jul. 8, 2014

Related U.S. Application Data

(63) Continuation of application No. 13/625,352, filed on Sep. 24, 2012, now Pat. No. 8,770,504.

(60) Provisional application No. 61/538,190, filed on Sep. 23, 2011.

(51) Int. Cl.
*A01K 89/01* (2006.01)
*A01K 89/017* (2006.01)

(52) U.S. Cl.
CPC ................... *A01K 89/017* (2013.01)

(58) Field of Classification Search
CPC .. A01K 89/012; A01K 89/015; A01K 89/017; A01K 89/0184
See application file for complete search history.

(56) References Cited

U.S. PATENT DOCUMENTS

| 902,447 | A | 10/1908 | Piper |
| 1,005,015 | A | 10/1911 | French |
| 2,190,398 | A | 2/1940 | Bugatti |
| 2,714,271 | A | 8/1955 | Stratton |
| 2,760,736 | A | 8/1956 | Mihalko et al. |
| 2,866,291 | A | 12/1958 | Duell |
| 3,017,134 | A | 1/1962 | Duvall |
| 3,030,046 | A | 4/1962 | Markoff-Moghadam |
| 3,248,819 | A | 5/1966 | Stealy |
| 3,437,282 | A | * 4/1969 | Larime ............... A01K 89/012 200/4 |
| 3,512,729 | A | * 5/1970 | Miller ................. A01K 89/012 242/225 |
| 3,922,808 | A | 12/1975 | Rieth et al. |
| 4,021,003 | A | 5/1977 | Watkins |

(Continued)

FOREIGN PATENT DOCUMENTS

JP 3160954 * 7/2010

*Primary Examiner* — Emmanuel M Marcelo
(74) *Attorney, Agent, or Firm* — Mark D. Bowen; Malin Haley DiMaggio & Bowen, P.A.

(57) ABSTRACT

A variable speed motor driven fishing reel is powered by a brushless DC motor and adapted for remote control operation by adapting a salt water bait-casting reel with a motorized drive assembly including an end plate having an environmentally sealed cover removably connected thereto, and mounted on the opposite side of the reel from the manual crank, the drive assembly including a brushless DC out-runner motor having an output shaft connected to a planetary gear system configured to power rotation of the fishing reel spool axle for driving the spool. A power cable provides 12.0 volt DC power from a suitable on-board vessel power source. An electronic motor control system allows for variation of DC motor speed via a manually actuated speed control knob. A remote control device is adapted for wireless communication with the electronic motor control system to allow for remote activation of the DC motor in low and high speed modes.

5 Claims, 9 Drawing Sheets

(56) References Cited

U.S. PATENT DOCUMENTS

| | | | |
|---|---|---|---|
| 4,378,652 A * | 4/1983 | Lindgren | A01K 89/017 242/250 |
| 4,598,878 A * | 7/1986 | Steffan | A01K 89/017 242/249 |
| 4,634,072 A * | 1/1987 | Stealy | A01K 89/012 242/223 |
| 5,042,188 A | 8/1991 | Ho | |
| 5,156,351 A | 10/1992 | Cittadini | |
| 5,236,147 A | 8/1993 | Kaneko | |
| 5,309,664 A * | 5/1994 | Wright | A01K 91/02 43/26.1 |
| 5,397,071 A * | 3/1995 | Nanbu | A01K 89/017 242/250 |
| 6,012,665 A | 1/2000 | Olona | |
| 6,056,218 A * | 5/2000 | Nanbu | A01K 89/015 242/223 |
| 7,073,740 B2 * | 7/2006 | Westhoff | A01K 87/007 242/225 |
| 7,086,622 B1 * | 8/2006 | Whaley | A01K 97/00 242/250 |
| 7,175,120 B2 * | 2/2007 | Ono | A01K 89/017 242/250 |
| 7,309,039 B1 * | 12/2007 | Stone | A01K 89/017 242/225 |
| 7,334,749 B2 | 2/2008 | Terauchi et al. | |
| 7,398,939 B2 | 7/2008 | Terauchi et al. | |
| 8,579,222 B1 * | 11/2013 | Alvarez | A01K 89/017 242/224 |
| 8,770,504 B1 * | 7/2014 | Sandstrom | A01K 89/017 242/225 |
| 2004/0231723 A1 * | 11/2004 | Harrington | A01G 25/162 137/355.2 |
| 2005/0211812 A1 * | 9/2005 | Nakagawa | A01K 89/015 242/223 |
| 2005/0228581 A1 * | 10/2005 | Taboada | A01K 79/00 701/461 |
| 2005/0247809 A1 * | 11/2005 | Terauchi | A01K 89/017 242/250 |
| 2008/0108273 A1 * | 5/2008 | Alden | G09F 9/33 446/34 |
| 2009/0039190 A1 * | 2/2009 | Amano | A01K 89/017 242/250 |
| 2009/0277070 A1 * | 11/2009 | Lindgren | A01K 87/00 43/20 |
| 2009/0277984 A1 * | 11/2009 | Wee | A01K 89/015 242/257 |
| 2011/0209383 A1 * | 9/2011 | Tennyson | A01K 89/015 43/21 |
| 2012/0267466 A1 * | 10/2012 | Tracey | B65H 75/403 242/390.9 |
| 2013/0026276 A1 * | 1/2013 | Jyo | A01K 89/017 242/250 |

* cited by examiner

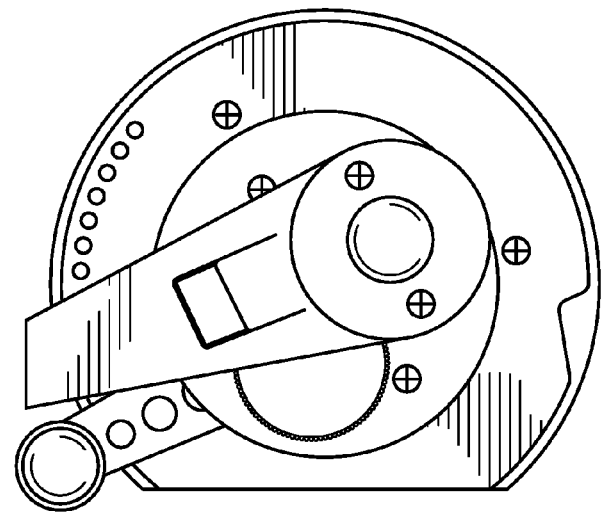
FIG. 13
(Amended)

MOTOR DRIVEN FISHING REEL

CROSS REFERENCE TO RELATED APPLICATIONS

This application is a continuation of U.S. patent application Ser. No. 13/625,352, filed on Sep. 24, 2012, now U.S. Pat. No. 8,770,504, which claims the benefit of provisional U.S. Patent Application Ser. No. 61/538,190, filed on Sep. 23, 2011.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to fishing reels, and particularly to motorized electrically power driven fishing reels used in sport fishing.

2. Description of Related Art

Fishing is a popular sport, hobby, and commercial venture around the world. Modern fishing typically involves the use of a rod, reel and tackle. As is well known, a fishing reel is typically connected to the fishing pole, and includes a spool to allow for fishing line to be drawn out and reeled in. There are a wide variety of fishing reels including, bait-casting reels, spinning reels, spin casting reels, and saltwater conventional and casting reels.

Sport fishing for game fish, such as sword fish, often involves "deep drop" techniques that use heavy test (65.0 0 80.0 lb. test) and/or braided fishing line dispensed to significantly deep depths, typically depths of 1800 feet or more. In such situations, the length of line dispensed from the reel renders manual retrieval a time consuming and laborious process.

As a result, the prior art reveals advancements in fishing reel design directed to providing fishing reels adapted with power assisted winding. For example, U.S. Pat. No. 902, 447, issued to Piper in 1908, disclose a fishing pole having an electrically operated winding reel. Various other early power assisted fishing reels are disclosed in the following references: U.S. Pat. No. 1,005,015, issued to French (1911); U.S. Pat. No. 2,190,398, issued to Bugatti (1937); U.S. Pat. No. 2,714,271, issued to Stratton (1955); and U.S. Pat. No. 2,760,736, issued to Mihalko (1956). U.S. Pat. No. 3,922, 808, issued to Rieth et al. (1975), discloses a trolling reel capable of automatically positioning the end a line at a desired distance or depth. Further, U.S. Pat. No. 4,021,003, issued to Watkins (1977) and others disclose powered reels that retain the ability to manually reel in the line. U.S. Pat. No. 5,236,147, issued to Kaneko (1993), discloses a fishing reel with a computer line length and display that determines the unwound length of fishing line based on the number of spool revolutions. Further, U.S. Pat. No. 7,175,120, to Ono (2007), and U.S. Pat. Nos. 7,334,749 and 7,398,939, issued to Terauchi et al. (2008) disclose electric fishing reels patented by Diawa Seiko, Inc.

While the above-referenced disclosures reveal limited advancements in the art of motor driven fishing reels there exists a need for further advancements in the art. More particularly, a number of the prior art disclosures rely on conventional brushed DC electric motors to provide the driving force for the reel. Brushed DC electric motors have metallic brushes that are highly susceptible to corrosion related failure, particularly when used in harsh salt water environments. An additional limitation common in the prior art systems is the limitation of having but a single, relatively slow speed. Yet another limitation present in the art relates to the lack of remote control actuation. Accordingly, there exists a need for advancements in the art of motor driven fishing reels.

BRIEF SUMMARY OF THE INVENTION

The present invention overcomes the disadvantages present in the art by providing a motor driven fishing reel powered by a variable speed brushless electric DC motor and adapted for remote control operation. In accordance with a preferred embodiment, a salt water bait-casting reel is adapted with a motorized drive assembly including an end plate having an environmentally sealed cover removably connected thereto, and mounted on the opposite side of the reel from the manual crank. Housed within the cover is a motorized drive assembly including a brushless DC motor having an output shaft connected to a planetary gear system configured to power rotation of the fishing reel spool axle for driving the spool. A power cable provides 12.0 volt DC power from a suitable on-board vessel power source. An electronic motor control system allows for variation of DC motor speed via a manually actuated speed control knob. A remote control device is adapted for wireless communication with the electronic motor control system to allow for remote activation of the DC motor in low and high speed modes. The fishing reel may further be adapted to include a level winding system to ensure that the line is evenly wound on the spool. The level wind system may incorporate a digital display for displaying the length of line that has been cast.

Accordingly, it is an object of the present invention to provide an improved motor driven fishing reel.

Another object of the present invention is to provide a motor driven fishing reel having improved corrosion resistance.

Yet another object of the present invention is to provide a motor driven fishing reel capable of operating at variable speeds.

Still another object of the present invention is to provide a motor driven fishing reel adapted with wireless communications to allow for remote operation thereof.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 13 depicts a detailed right hand side view of the reel;

DETAILED DESCRIPTION OF THE INVENTION

Figure 1:
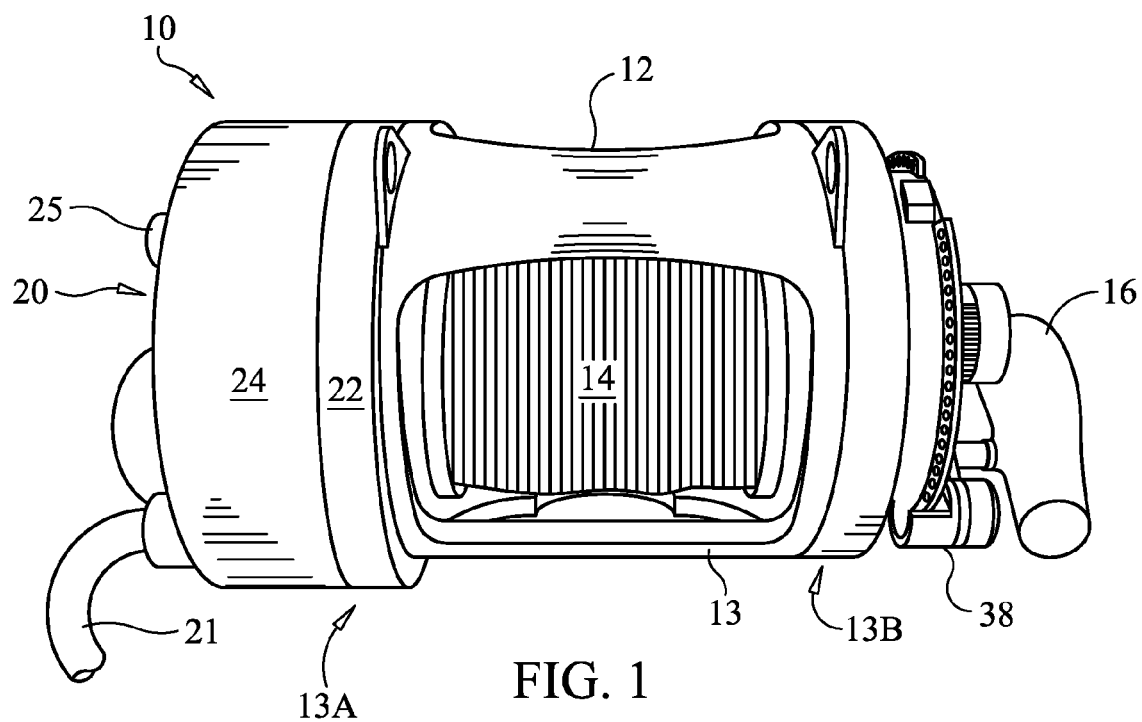
FIG. 1 is a rear perspective view of a motor driven fishing reel in accordance with the present invention.
Figure 2:
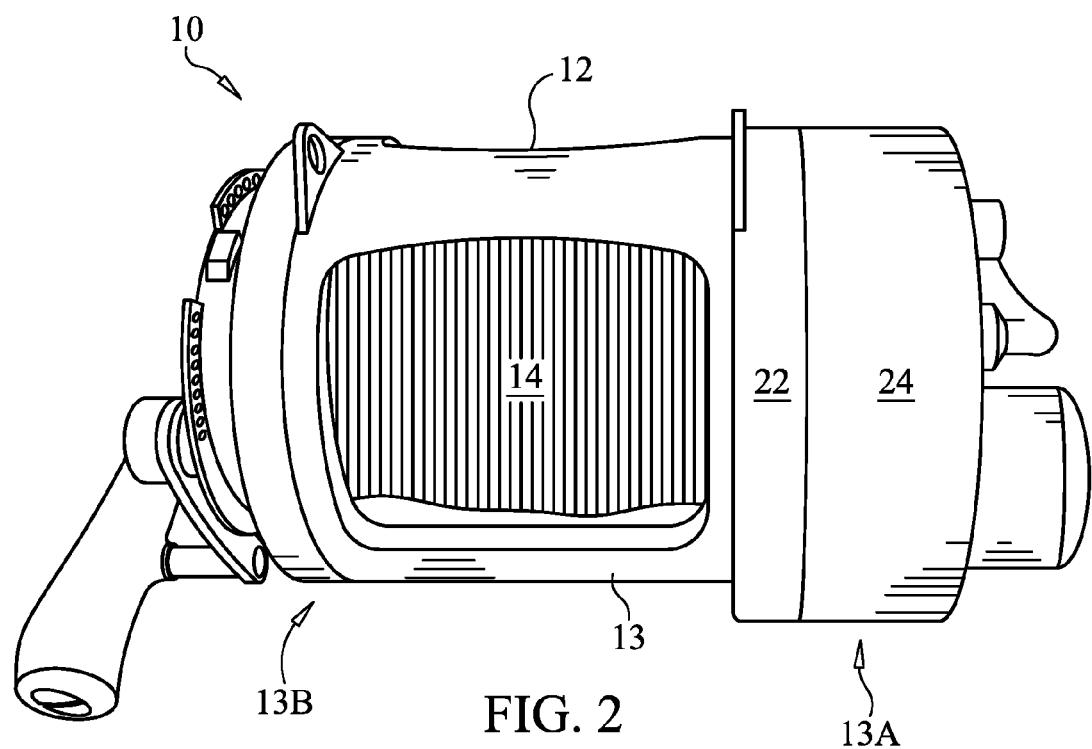
FIG. 2 is a front perspective view thereof.
Figure 3:
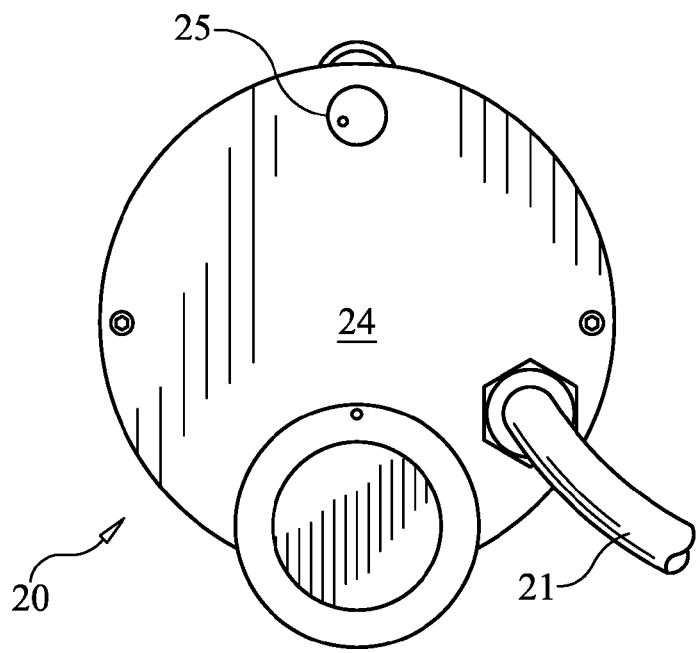
FIG. 3 is a left hand side view thereof.
Figure 4:
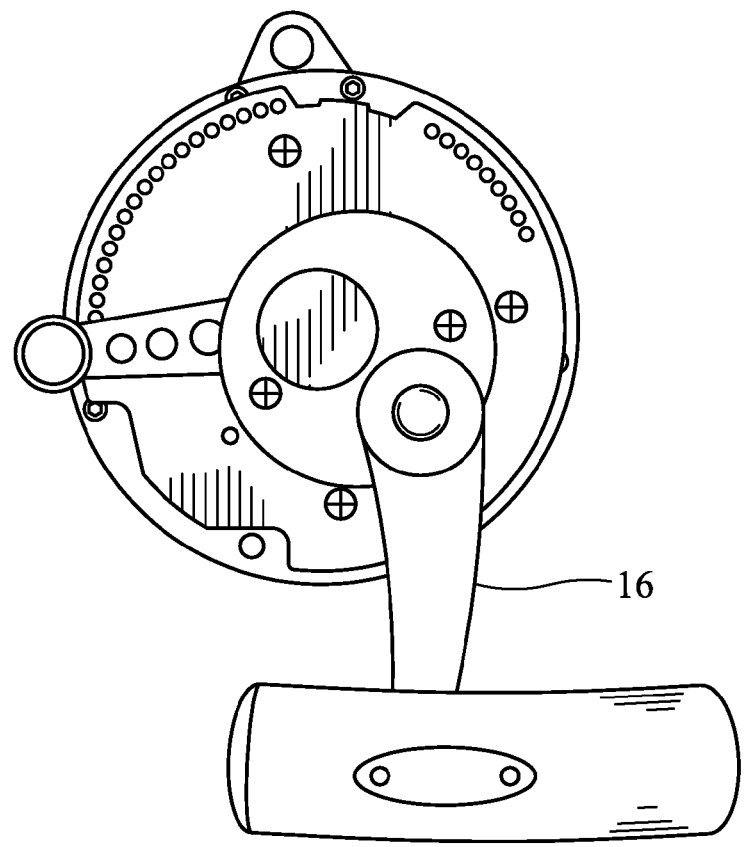
FIG. 4 is a right hand side view thereof.

With reference now to the drawings, FIGS. 1-17 depict a preferred embodiment and alternate embodiment of a variable speed motor-driven fishing reel, generally referenced as 10, in accordance with the present invention. Turning first to FIGS. 1-14, a motor driven fishing reel 10 includes an otherwise conventional salt water bait-casting reel 12 having a main body 13 having opposing first and second (e.g. right-hand and left-hand) sides, referenced as 13A and 13B. A line spool 14 is rotatably mounted to main body 13 via a spool axle 14A, and configured for manual actuation by a hand crank 16 disposed on the first side 13A of main body 13. Main body 13 is adapted with a motorized drive assembly, generally referenced as 20 attached to the second side of main body 13, namely the side opposite of the crank 16. While the preferred embodiment discloses crank 16 disposed on the first (right-hand) side and motorized drive assembly 20 disposed on the second (left-hand) side, as is customary for right handed users, it should be apparent the crank 16 and motorized drive assembly may be oppositely mounted for left-handed users.

Figure 5:
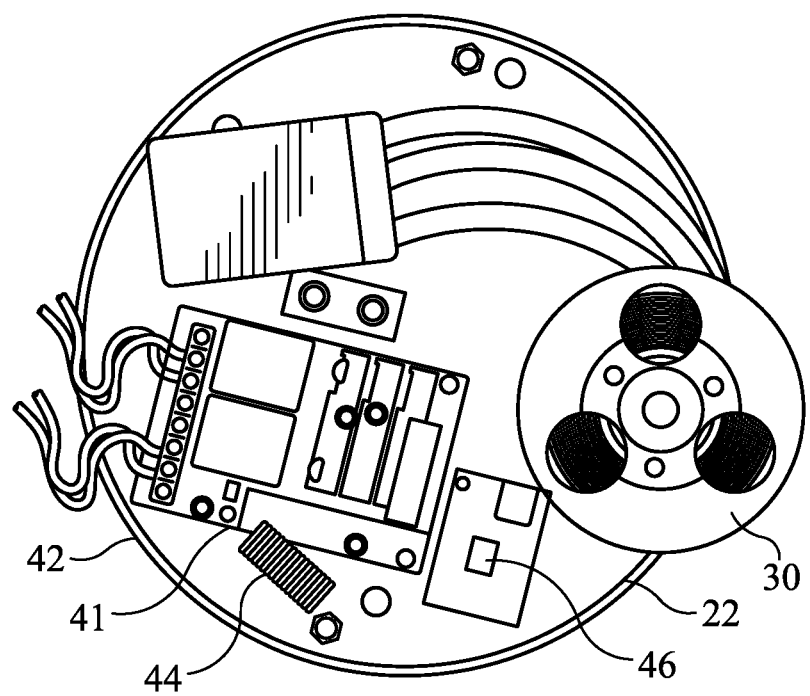
FIG. 5 depicts the electric motor and motor controls for a motor driven fishing reel in accordance with the present invention.
Figure 6:
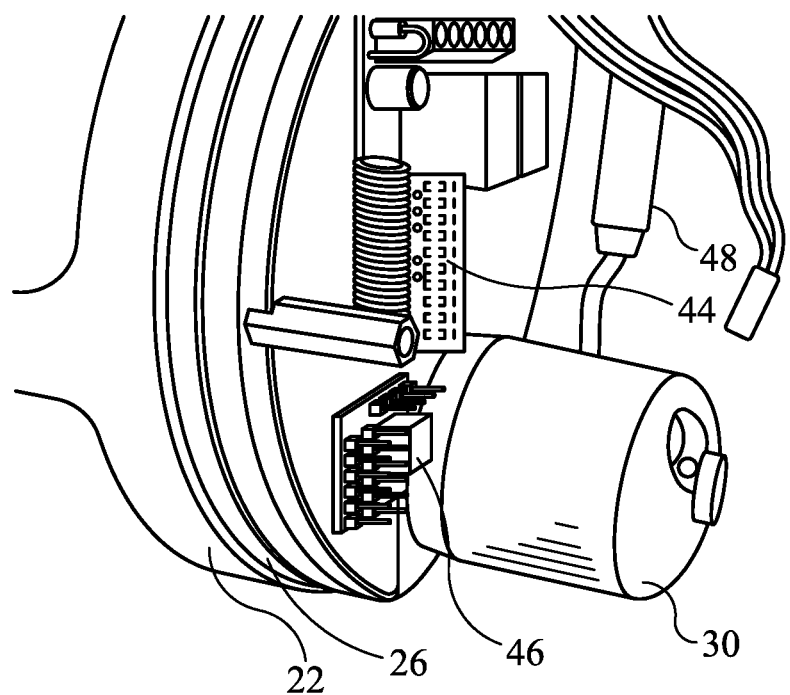
FIG. 6 is a perspective view thereof.

A significant aspect of the present invention involves adapting the bait casting reel 12 with a motorized drive assembly, generally referenced as 20, housing an electric motor and associated controls as more fully discussed herein. As best seen in FIGS. 5 and 6, motorized drive assembly 20 includes an end plate 22 sized and adapted for mating attachment to the left-hand side 13A of main body 13, opposite of the right-hand side 13B and manual hand crank 16. As should be apparent, however, crank 16 and motorized drive assembly 20 may be alternately mounted on either side of main body 13. A cover 24 is removably connected to end plate 22 and an environmental seal is provided by an O-ring gasket 26 disposed circumferentially on end plate 22.

Figure 7:
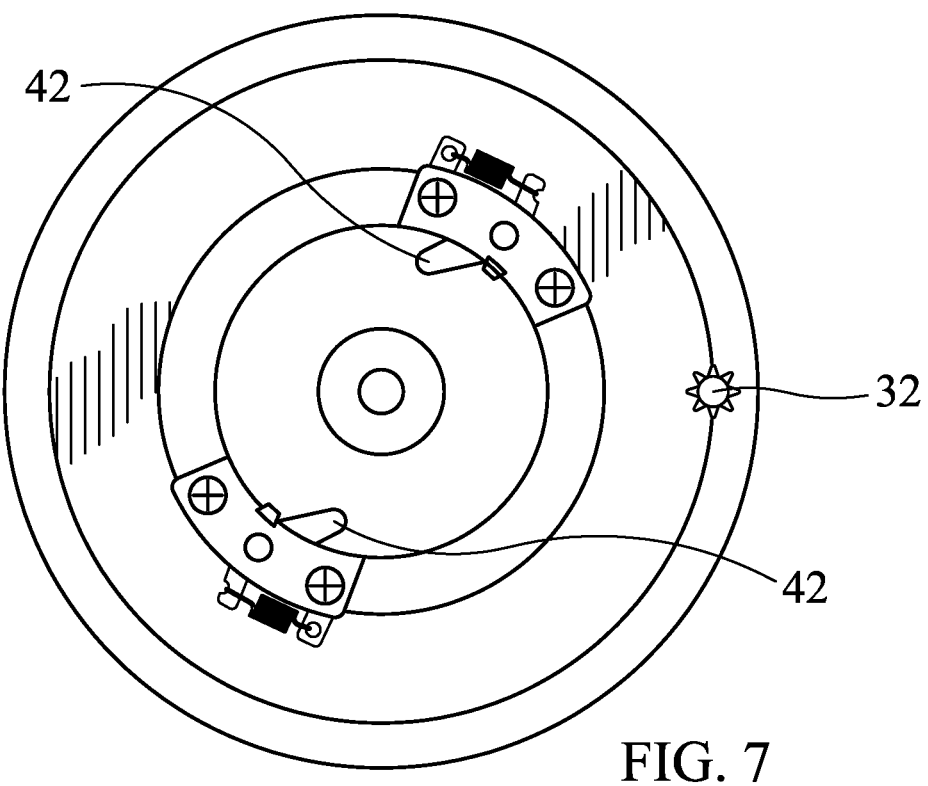
FIG. 7 depicts an interior view at the left hand end of the reel.
Figure 8:
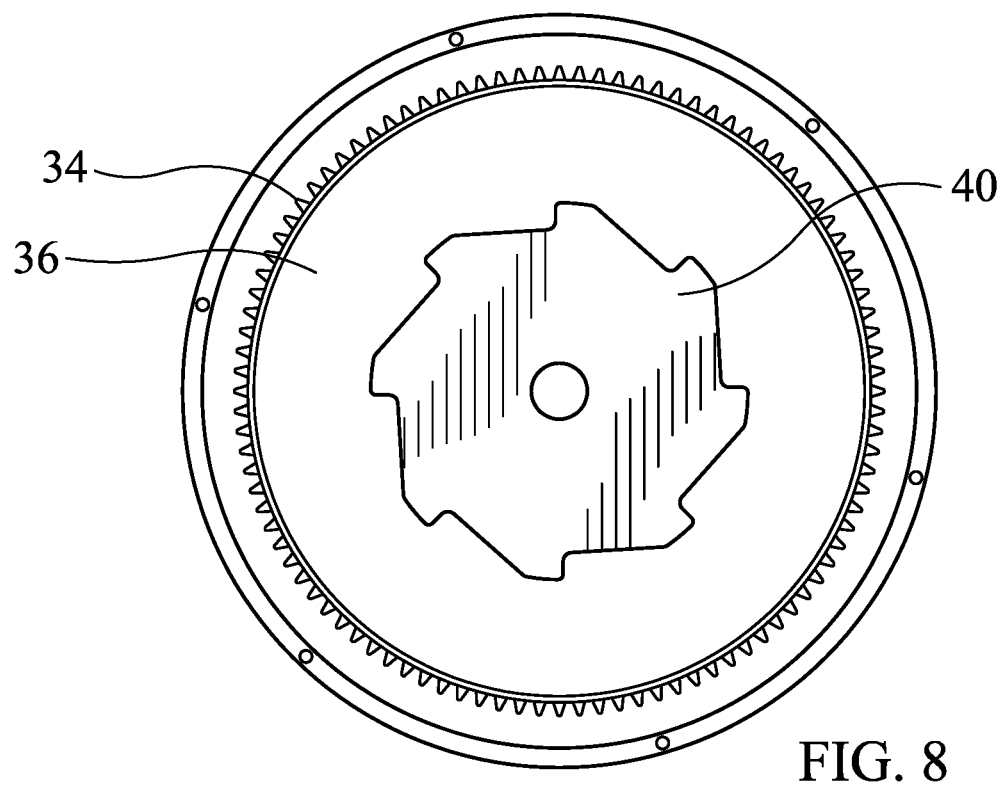
FIG. 8 depicts the spool axle drive gear and anti-reverse gear.
Figure 9:
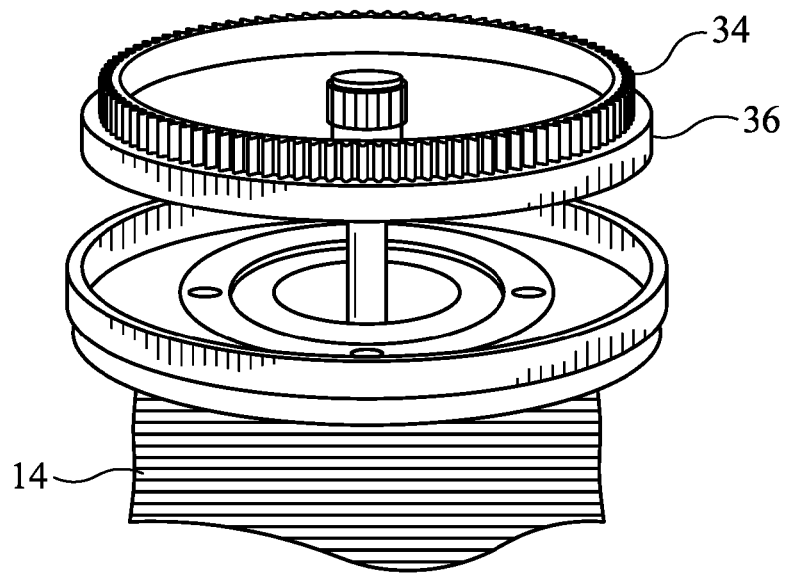
FIG. 9 illustrated removal of the spool drive gear.
Figure 10:
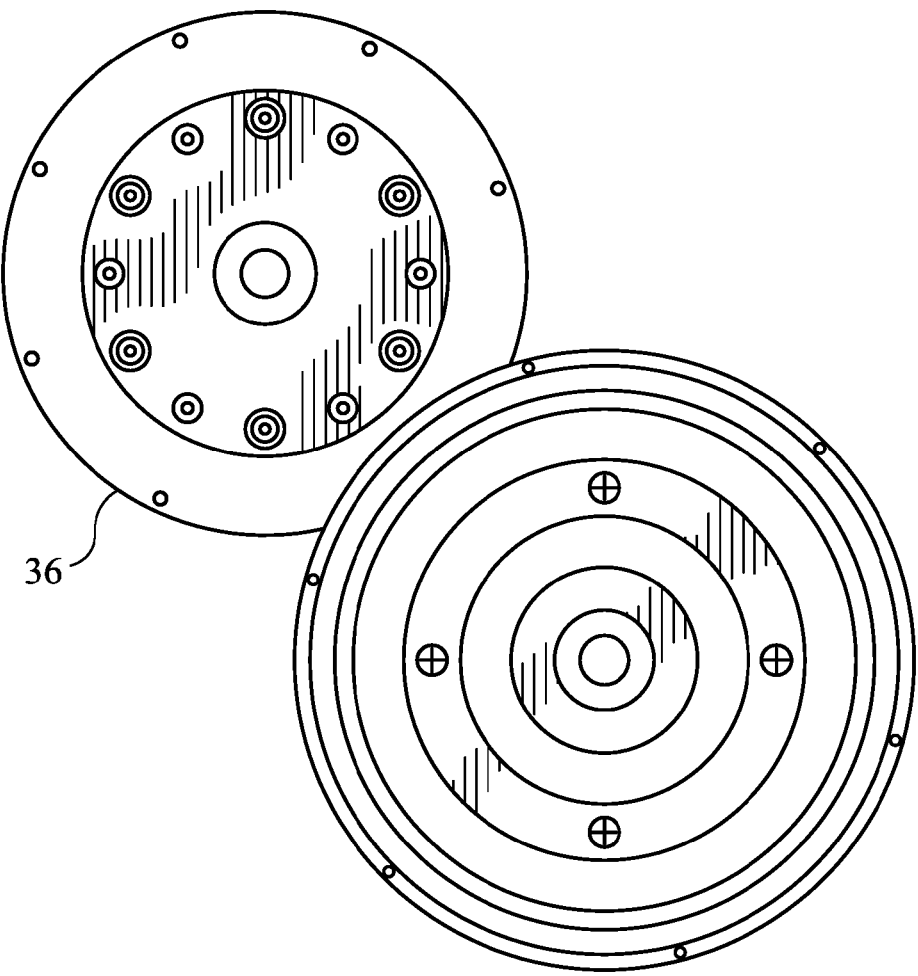
FIG. 10 depicts the clutch connected to the spool drive gear in exploded relation with the spool.

Motorized drive assembly 20 includes an electric motor, generally referenced as 30, mounted to endplate 22. In a preferred embodiment, motor 30 comprises a brushless DC motor, that operates on 12.0 volt direct current (12.0 VDC) and consumes approximately 1,400 Watts of electrical power. DC power from a suitable on-vessel power source is provided to motorized drive assembly via power cable 21. A significant aspect of the present invention involves the use of a brushless out-runner motor thereby avoiding the use of brushes that have led to corrosion related premature failure in prior art devices. Motor 30 has an output shaft connected to a system of intermeshing gears including a first gear 32, a second gear 34. Gear 34 is attached to a clutch 36 that transfers power to line spool 14. Clutch 34 is an integral part of the drag system on the off-the-shelf manually actuated reel. In accordance with the present invention, the clutch is modified by adding gear 34 to clutch 36 thereby converting the clutch assembly into a system capable of transferring power to the reel. A clutch actuation lever 38 is coupled to a cam mechanism (not shown) to allow the user to adjust the contact pressure between clutch 36 and spool 14 thereby providing adjustable drag settings. As illustrated in FIGS. 7 and 8, an anti-reverse mechanism includes a toothed wheel 40 attached to clutch 36, and pivotally connected pawls 42 that ride along the edge of toothed wheel 40 to prevent reverse rotation of spool 14 when engaged. The preferred embodiment of the present invention has demonstrated significant performance advances over the prior art. More particularly, the motor driven fishing reel in accordance with the present invention is capable of reeling in fishing line at a rate of approximately 500 feet-per-minute.

Motorized drive assembly 20 further includes electronics and controls that allow for speed control and wireless remote actuation. More particularly, motorized drive assembly includes a manually actuated speed control knob 25 projects from cover 24. Speed control knob 25 is connected to a potentiometer to allow for adjustment of the input voltage to motor 30 between minimum and maximum settings to allow the user to selectively adjust motor speed, and hence reel winding speed. As seen in FIGS. 5 and 6, motorized drive assembly further includes a circuit board 41 containing a radio frequency (RF) receiver 44 and a pair of RF activated solenoids 42, a microprocessor 46, and a motor speed controller 48.

FIG. 13 is an electrical control block diagram for the electrical control system for the motor driven fishing reel in accordance with the present invention. The electrical control system includes a speed control potentiometer 41 functions to allow for speed variation via direct user input by manual actuation of speed control knob 25 (not shown in FIG. 13). Speed control potentiometer 41 functions to provide a speed control signal to microprocessor 46, which is in electrical communication with a motor speed controller 48. Microprocessor 46 receives the speed control signal and generates an output signal to motor speed controller 48 which uses that signal to controls the input voltage to motor 30. Using this control architecture, rotation of the control knob (25) on speed control potentiometer 41 functions to vary motor/reel winding speed between a minimum value (i.e. full stop) and a maximum value (i.e. full speed).

A further significant aspect of the present invention involves providing a motor driven fishing reel 10, adapted for wireless remote controlled operation. More particularly, as illustrated in FIG. 13, the control architecture includes a radio frequency activated solenoid 42 responsive to a control signal output from an RF receiver 44, which is adapted to receive wireless transmissions from an RF transmitter 45. RF transmitter 45 is preferably a small, portable, battery-powered FOB-type device having manually actuated buttons 45A and 45B corresponding to low and high speed operation. Accordingly, the user can activate the motorized drive assembly from a remote location using RF transmitter 45 to send a signal to RF receiver 44, which in turn activates solenoid 42. In a preferred embodiment, RF activation of solenoid 42 functions to cause motor 30 to operate at full speed, however, any suitable speed is considered within the scope of the present invention.

Figure 11:
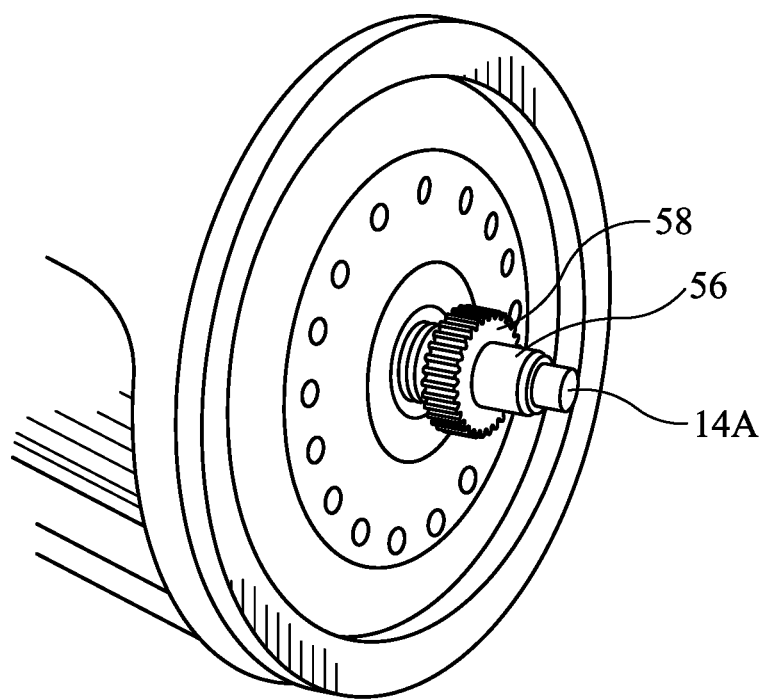
FIG. 11 depicts the right hand end of the spool axle.
Figure 12:
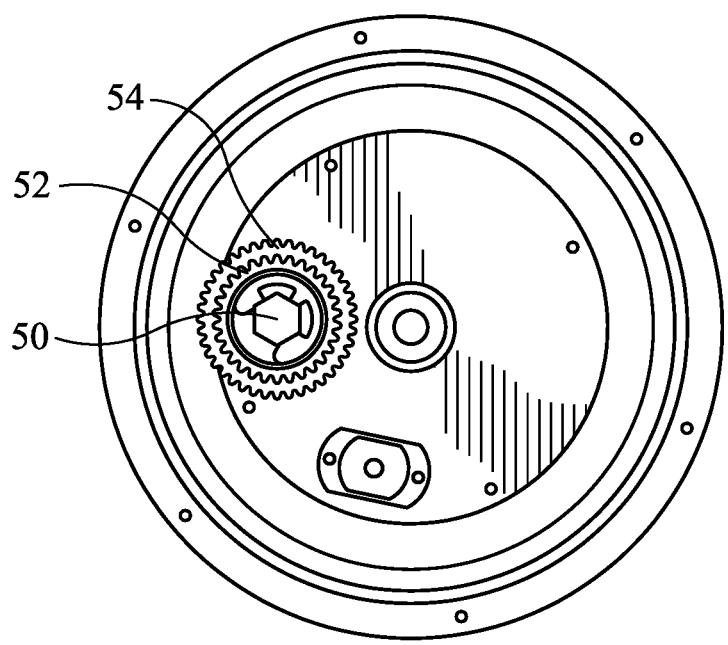
FIG. 12 depicts high and low speed gears connected to the manual winding crank.
Figure 14:
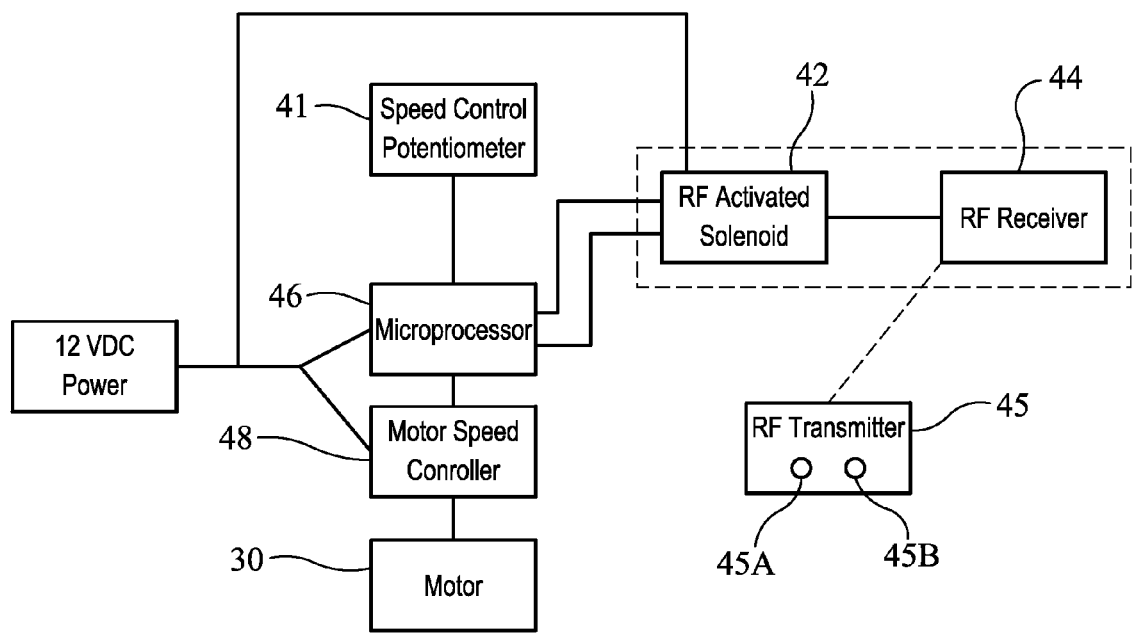
FIG. 14 is an electrical schematic block diagram illustrating electro-mechanical control architecture for a motor-driven fishing reel in accordance with the present invention.

Finally, the present invention includes means for disengaging reel crank 16 from spool 14 to prevent crank 16 from rotating in unison with the rapidly rotating spool 14 when in a powered winding mode so as to prevent crank 16 from inducing excessive vibration while winding in line. In accordance with this aspect of the present invention, the manual winding mechanism is modified. More particularly, the reel typically includes a system of gears that function to allows for manual low and high speed winding settings as illustrated in FIGS. 11-13. Manual rotation of crank 16 functions to rotate a crank axle 50 having low and high speed gears, referenced as 52 and 54 mounted thereto. A user actuated manual speed selection switch 17 is disposed on the reel and/or crank and functions to allow the user to manually select low and high speeds by selective engagement one of low and high speed gears 52 and 54 with mating gears 56 and 58 mounted to the axle 14A of spool 14. In accordance with the present invention, the teeth of gear 56 are ground off as shown in FIG. 11. This allows the manual crank 16 to free wheel when speed selection switch 17 is configured to the high speed setting. The winding mechanism could alternately be configured with the threads removed from gear 58 within the spirit of the invention.

Figure 15:
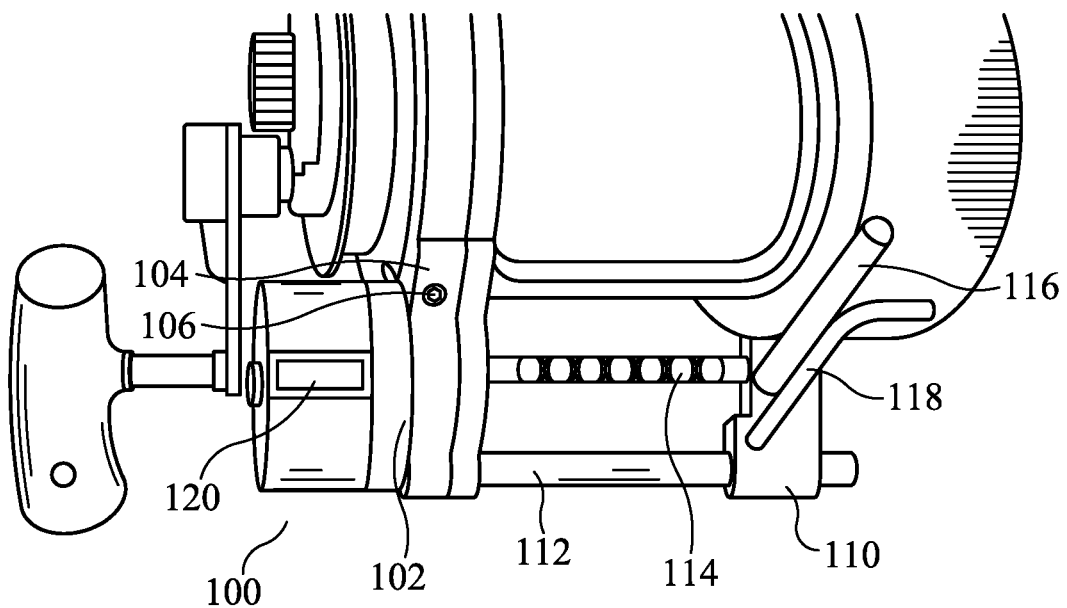
FIG. 15 is a partial front perspective view of a motor driven fishing reel in accordance with the present invention further adapted with an optional level winding accessory.
Figure 16:
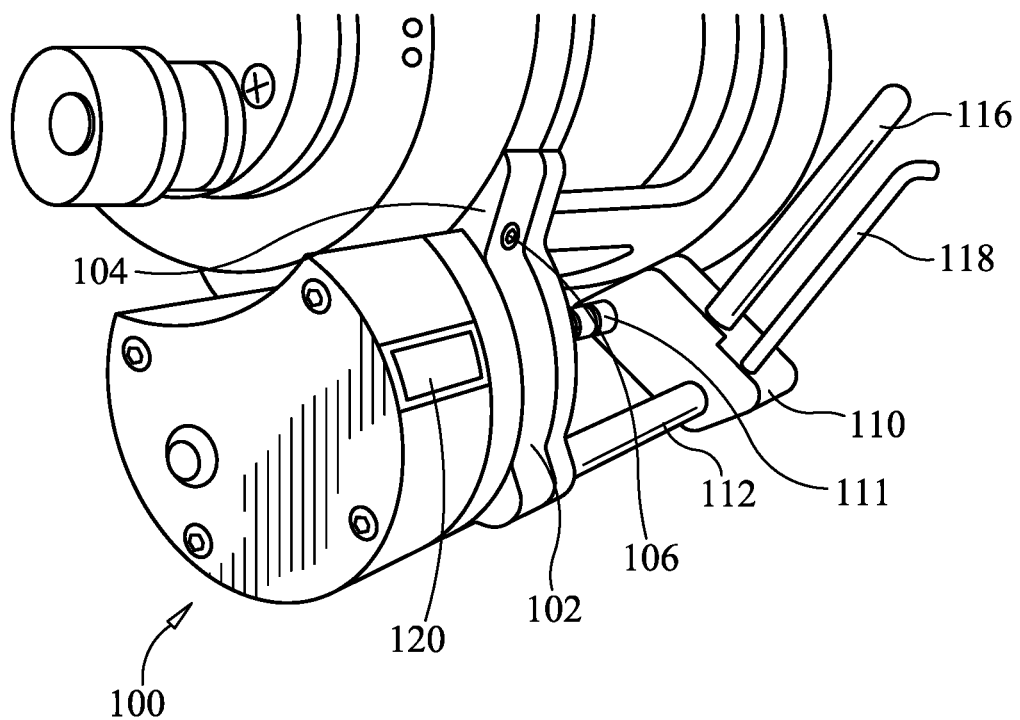
FIG. 16 is a partial right side perspective view thereof.
Figure 17:
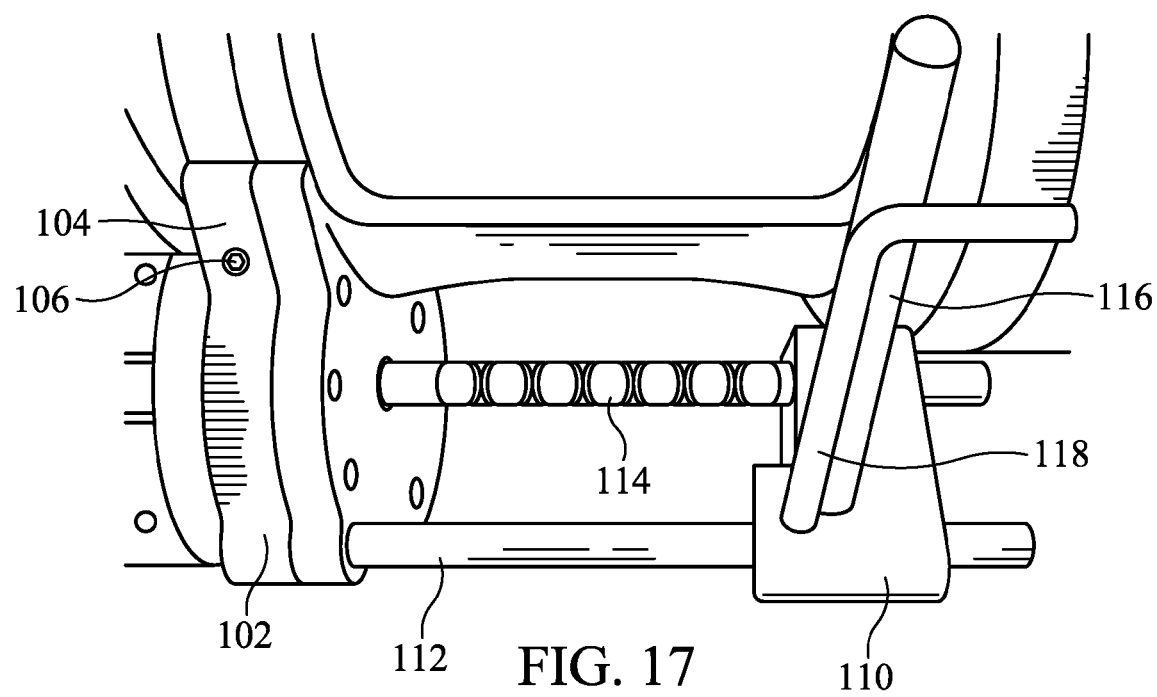
FIG. 17 is a partial top front view thereof.

FIGS. 15-17 depict a motor driven fishing reel 10 adapted with an optional level winding accessory, generally referenced as 100. Level winding accessory 100, is preferably mounted to the right hand side of reel 10 and includes a main body 102 having a mounting flange 104 which receives a fastener 106 to affix accessory 100 to reel 10 as best seen in FIG. 15. Level winding accessory further includes a traversing carriage 110 that traverses back and forth between the opposing left and right hand portions of the spool by riding along a guide rail 112 and a cross-cut reversing lead screw 114. Carriage 110 further includes a pair of projecting line guides, referenced as 116 and 118 that function to guide the winding of the line generally evenly onto the rotating reel spool as carriage 110 traverses back and forth. Level winding accessory 100 further includes a digital display 120 and associated electro-mechanical elements that function to track and display the length of line that has been spooled out. Digital display 120 thus allows the user to precisely determine the length of line cast and/or length of line remaining while winding in.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A motor driven fishing reel comprising:
   a main body having opposing sides;
   a fishing line spool rotatably mounted to said main body via a spool axle;
   a motorized drive assembly affixed to said main body;
   said motorized drive assembly including an electric motor having an output shaft configured for powered rotation of said spool;
   a clutch mechanically directly connected to said output shaft and to said spool to transfer power to said spool thereby causing powered rotation thereof;
   an electrical control system to allow for user variation of the speed of said motor thereby allowing for user regulation of spool winding speed;
   said motor regulating the winding speed of said spool between minimum and maximum rotational speeds in direct proportion to said motor speed without requiring gear changes.

2. The motor driven fishing reel according to claim 1, further including means for wireless remote controlled actuation thereof.

3. The motor driven fishing reel according to claim 2, wherein said means for wireless remote controlled actuation includes a radio frequency activated solenoid responsive to a control signal output from an RF receiver, and a portable RF transmitter adapted to send RF transmissions to said RF receiver, said radio frequency activated solenoid actuating said electric motor in response to said control signal.

4. In a fishing reel having a main body with a rotatable spool attached thereto, said improvement comprising:
   a motorized drive assembly affixed to the main body;
   said motorized drive assembly including an electric motor having an output shaft mechanically connected to a clutch, said clutch transferring rotational power to said spool;
   a hand crank mechanically connected to said spool to allow manual rotation thereof;
   a switch configured to engage and disengage said handle from said spool independent of said clutch;
   an electrical control system to allow for user variation of the speed or said motor thereby allowing for user regulation of spool winding speed; and
   said electrical control system including means for wireless remote controlled actuation thereof.

5. The motor driven fishing reel according to claim 4, wherein said means for wireless remote controlled actuation includes a radio frequency activated solenoid responsive to a control signal output from an RF receiver, and a portable RF transmitter adapted to send RF transmissions to said RF receiver, said radio frequency activated solenoid actuating said motor to a full speed setting in response to said control signal.

\* \* \* \* \*